United States Patent [19]

Aoyama et al.

[11] Patent Number: 4,912,644
[45] Date of Patent: Mar. 27, 1990

[54] METHOD OF AND APPARATUS FOR UNFOLDING A SHEET METAL PART EMPLOYING A CAD APPARATUS

[75] Inventors: Yoshitada Aoyama; Takeshi Haga, both of Tokyo, Japan

[73] Assignee: Oki Electric Industry Co., Ltd., Tokyo, Japan

[21] Appl. No.: 360,029

[22] Filed: Jun. 1, 1989

Related U.S. Application Data

[63] Continuation-in-part of Ser. No. 125,984, Nov. 27, 1987.

[30] Foreign Application Priority Data

Dec. 2, 1986 [JP] Japan .................. 61-285880

[51] Int. Cl.$^4$ .................................... G06F 7/00
[52] U.S. Cl. ................................... 364/472; 364/521
[58] Field of Search .............. 364/472, 521, 522, 518, 364/300

*Primary Examiner*—Allen MacDonald
*Attorney, Agent, or Firm*—Wenderoth, Lind & Ponack

[57] ABSTRACT

A method of and apparatus for unfolding a sheet metal part has a three-dimensional scanner which is moved along the profile of a three-dimensional surface model to decompose the three-dimensional surface model into groups of pattern entities. Auxiliary lines interconnecting the end points of pattern entities of the internal shape of the sheet metal part and the end points of the pattern entities of the external shape of the sheet metal pattern including the end points of the pattern entities of the internal shape are produced. An unfolding three-dimensional surface model is constructed by assembling the pattern entities and the auxiliary lines, and then the reconstructed three-dimensional surface model is scanned by the three-dimensional scanner to unfold it into a two-dimensional unfolded pattern. Bends in the sheet metal part are detected from the variation of the direction of the scanning axis of the three-dimensional scanner, the length of the pattern entities each having a portion corresponding to a bend is corrected by a bending allowance, and a bending line is added to the unfolded pattern at a position corresponding to a bend. When the three dimensional surface model has an auxiliary line, the pattern entities of the corresponding internal shape are unfolded, and then the auxiliary line is selected after the completion of the scanning operation.

2 Claims, 23 Drawing Sheets

EXTERNAL SHAPE SIDE INTERCONNECTION
POINT EXTRACTION SR

[THREE-DIMENSIONAL SPACE]  [TWO-DIMENSIONAL UNFOLDING PLANE]

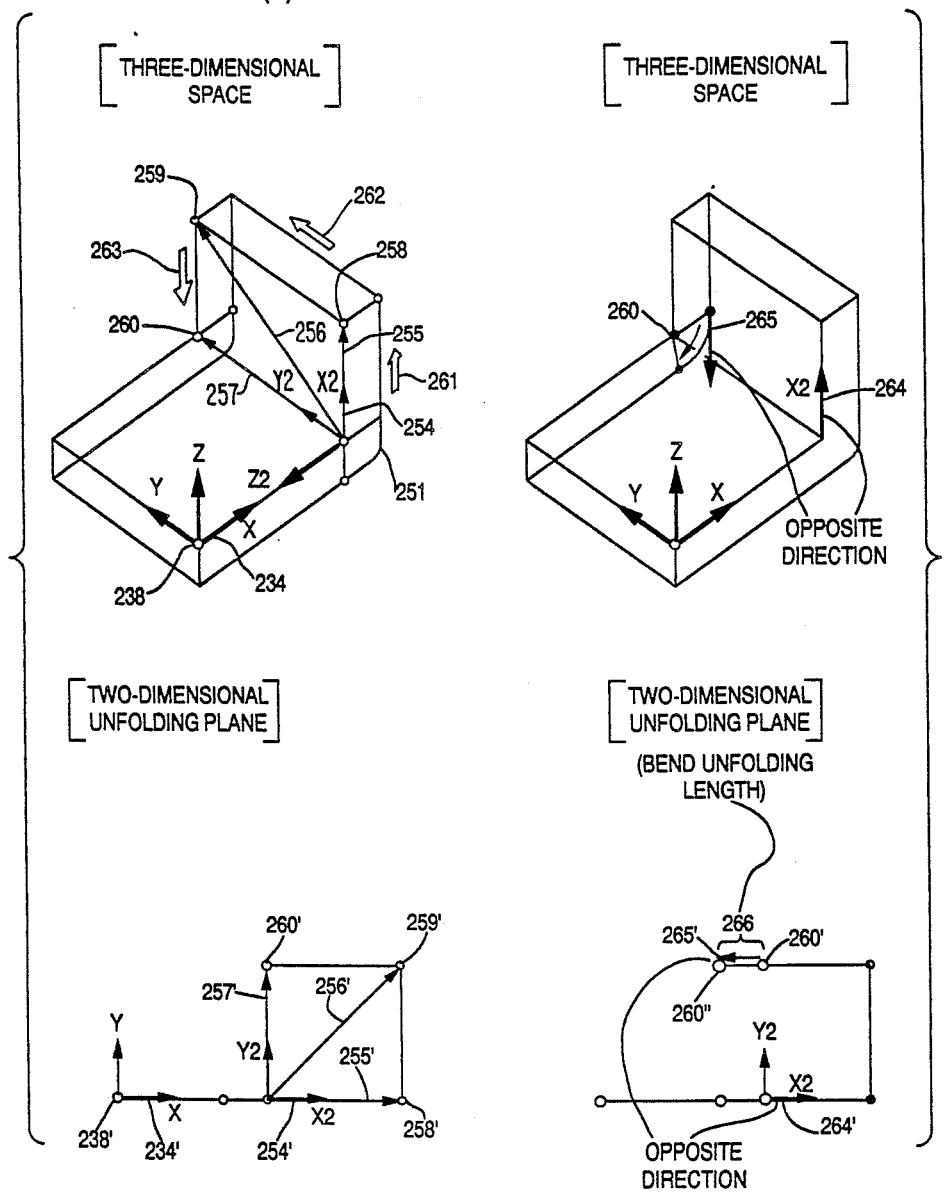

METHOD OF AND APPARATUS FOR UNFOLDING A SHEET METAL PART EMPLOYING A CAD APPARATUS

CROSS-REFERENCE TO RELATED APPLICATIONS

This application is a continuation-in-part of now abandoned application Ser. No. 07/125,984, filed Nov. 27, 1987.

BACKGROUND OF THE INVENTION

1. Field of the Invention

The present invention relates to a method of and apparatus for unfolding a sheet metal part employing a CAD apparatus.

2. Description of the Prior Art

Referring to FIG. 8 showing an exemplary sheet metal part unfolding procedure in a conventional sheet metal part unfolding method employing a CAD apparatus, the conventional sheet metal part unfolding method comprises a sheet metal part separating step S31, a surface entity extracting step S32, and an unfolding step S33.

In the sheet metal part separating step S31, the entities of the three-dimensional model 1 are separated into a sheet metal part surface 2, a sheet metal part surface 3, sheet metal part surface interconnecting entities 4 through the conversational operation of a CAD apparatus. In the surface entity extracting step S32, either the sheet metal part surface 2 or 3 is extracted as a part surface pattern 12. In the unfolding step S33, unfolding reference entities and 6, an unfolding axis entity 7 and unfolding entities 8 to 11 are specified through the conversational operation of the CAD apparatus to produce an unfolded pattern 13.

Referring to FIG. 9, a conventional conversational three-dimensional sheet metal part unfolding CAD apparatus comprises a pattern display unit 21, a pattern operating data input unit 22, a position data input unit 23, a pattern processing unit 24, a pattern memory unit 25 and a sheet metal part unfolding unit 26.

In operation, a pattern operating command, such as a pattern shifting command or a pattern deleting command is input through the conversational operation of the pattern operating data input unit 22, and position data is input by operating the position data input unit 23. Upon the reception of the pattern operating command and the position data, the pattern processing unit 24 processes the pattern operating command and the position data, and inputs the results of operation to the pattern memory unit 25, produces display data to be displayed, and inputs the display data to the pattern display unit 21. Then, the pattern display unit 21 displays the three-dimensional model 1 shown in FIG. 8. The pattern memory unit 25 stores pattern entity names, such as circles and lines, and the pattern position. The sheet metal part unfolding unit 26 executes the sheet metal part unfolding steps S31, S32 and S33 shown in FIG. 8 to produce the unfolded pattern 13.

However, in carrying out such a conventional sheet metal part unfolding method employing a CAD apparatus, pattern entity specifications for unfolding the bends of a sheet metal part, and bend elongation specifications for specifying the elongation of bends in unfolding a sheet metal part are required, which require many steps of a conversational operation and many steps of a bend elongation calculating operation.

SUMMARY OF THE INVENTION

Accordingly, it is an object of the present invention to provide a method of and apparatus for unfolding a sheet metal part employing a CAD apparatus, capable of solving the aforesaid problems of the prior art and capable of accomplishing a sheet metal part unfolding operation through a procedure including a comparatively small number of steps.

To achieve the object of the present invention, the present invention provides a method of unfolding sheet metal part employing a CAD apparatus, which comprises: a first step in which a three-dimensional surface model of a sheet metal part provided by a data input device is decomposed into pattern entities through the scanning movement of a three-dimensional scanner having a scanning axis whose length is equal to the thickness of the sheet metal forming the sheet metal part, and the pattern entities thus obtained are classified into groups; a second step in which auxiliary lines are generated, each auxiliary line connecting an end point of one of the pattern entities of an internal shape of the sheet metal part and an end point of a pattern entity of an external shape forming a plane including the end point of the pattern entity of the internal shape; a third step in which the three-dimensional surface model decomposed in the first step is reconstructed into a reconstructed three-dimensional surface model by assembling the pattern entities and the auxiliary lines, and the reconstructed three-dimensional surface model is unfolded into a two-dimensional pattern on the basis of a scanning operation of the three-dimensional scanner in which the external shape of the reconstructed three-dimensional surface model is scanned by the three-dimensional scanner having the scanning axis corresponding to the thickness of the sheet metal and the loci of the thus obtained three-dimensional scanner is unfolded into the two-dimensional reference plane; a fourth step in which a decision is made on the basis of the direction of the scanning axis of the scanning three-dimensional scanner as to whether or not the sheet metal part has any bend, the length of a pattern entity corresponding to an unfolded bend unfolded in the third step when the sheet metal part has a bend or bends, and a bending line or lines are added to the unfolded two-dimensional pattern; a fifth step in which a decision is made as to whether or not the reconstructed three-dimensional surface model has any auxiliary lines and, when the reconstructed three-dimensional surface model has an auxiliary line or lines, the auxiliary line or lines and a pattern entity or entities of the internal shape connecting with the auxiliary line or lines are unfolded; and a sixth step in which an unfolded pattern or patterns corresponding to the auxiliary line or lines are deleted from the unfolded pattern of the three-dimensional surface model after the completion of the scanning operation of the three-dimensional scanner.

To further achieve the object of the present invention, the present invention provides an apparatus for unfolding a sheet metal part employing a CAD apparatus including a pattern display unit, a pattern operating data input unit, a position data input unit, a pattern processing unit, and a pattern memory, wherein said CAD apparatus further includes an automatic sheet metal part unfolding unit comprising: a three-dimensional scanning means for scanning a three-dimensional surface model of a sheet metal part along surfaces of the model representing the thickness of the sheet metal forming the sheet metal part and for decomposing the three-dimensional surface model into two part surface entities, entities interconnecting the two part surface entities and entities of a bend or bends; a closed pattern group interconnection means for producing an auxiliary line for interconnecting a group of entities forming the external profile of the sheet metal part, and a group of entities forming the internal profile of the sheet metal part such as punched hole or holes; a part surface interconnection means for assembling the entities obtained by decomposing the three-dimensional surface model to reconstruct a reconstructed three-dimensional surface model; a part surface memory means for storing data representing the shape of one of two major part surfaces of the sheet metal part; a part surface memory means for storing data representing the shape of the other of the two major part surfaces of the sheet metal part; a part surface interconnecting entity memory means for storing data representing entities interconnecting the two major part surfaces; a bend entity memory means for storing data representing entities of a bend or bends; an unfolding controller means for determining an unfolded pattern; and an unfolding data memory means for storing unfolding data for producing an unfolded pattern of the sheet metal part.

Thus, the present invention automatically unfolds the three-dimensional surface model of a sheet metal part input to the CAD apparatus through the first to sixth steps without requiring any command to be given by the operator or without requiring any conversational operation of the CAD apparatus, which reduces the steps of operation of the operator for obtaining an unfolded pattern, eliminates a procedure for calculating bend allowances, and improves the efficiency of the CAD apparatus.

The above and other objects, features and advantages of the present invention will become more apparent from the following description taken in conjunction with the accompanying drawings.

BRIEF DESCRIPTION OF THE DRAWINGS

FIGS. 18(a) through 18(e) are views illustrating external shape unfolding, respectively.

DESCRIPTION OF THE PREFERRED EMBODIMENT

First, the constitution of a three-dimensional sheet metal part unfolding CAD apparatus for carrying out a sheet metal part unfolding method, in a preferred embodiment, according to the present invention will be described.

Figure 3:
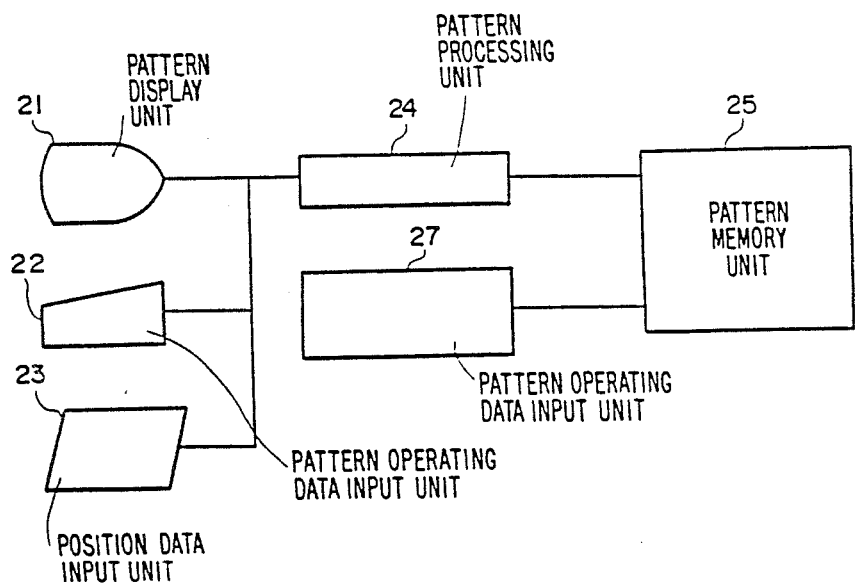
FIG. 3 is a block diagram of a three-dimensional sheet metal part unfolding CAD apparatus provided with an automatic sheet metal part processing apparatus.
Figure 9:
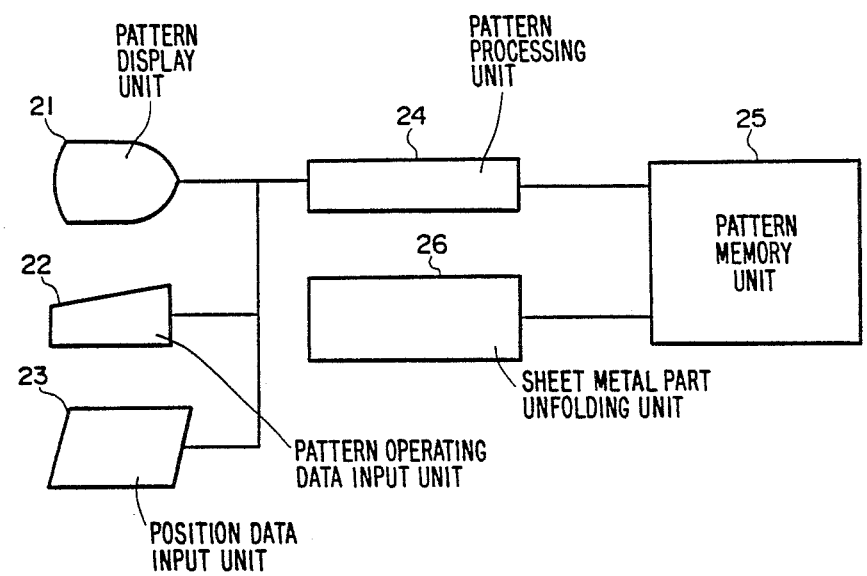
FIG. 9 is a block diagram of an exemplary conventional CAD apparatus.

Referring to FIG. 3, the CAD apparatus comprises a pattern display unit 21, a pattern operating data input unit 22, a position data input unit 23, a pattern processing unit 24, a pattern memory unit 25 and a pattern operating data input unit 27. The units 21, 22, 23, 24 and 25 are the same in constitution as those previously described with reference to FIG. 9, and are denoted by the same reference numerals. The automatic sheet metal part unfolding unit 27 automatically produces the unfolded pattern of the three-dimensional surface model of a sheet metal part.

Figure 2:
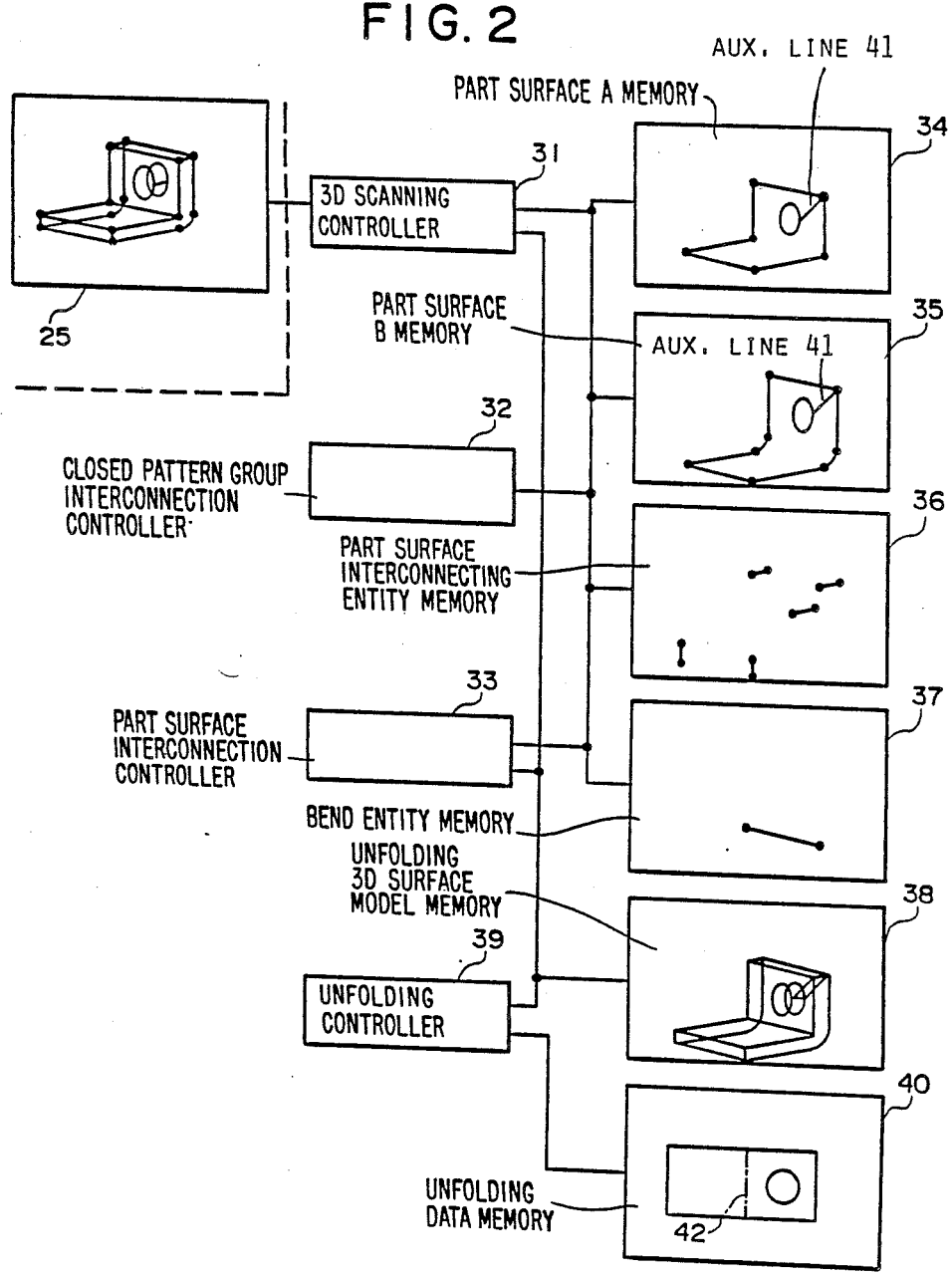
FIG. 2 is a block diagram of an automatic sheet metal part processing apparatus for carrying out the method of unfolding the sheet metal part of FIG. 1.

Referring to FIG. 2, the automatic sheet metal part unfolding unit 27 comprises: a three-dimensional scanning controller 31 which scans the surface model of a sheet metal part along planes indicating the thickness of the sheet metal forming the sheet metal part to decompose the surface model into two part surfaces, entities interconnecting the two part surfaces, and entities showing bends; a closed pattern group interconnection controller 32 which produces an auxiliary line 41 for interconnecting a group of entities forming the external profile of the sheet metal part, and a group of entities forming the internal profile, namely, a punched circular hole or a punched rectangular hole, of the sheet metal part; a part surface interconnection controller 33 which assembles the entities obtained by decomposing the surface model to reconstruct a reconstructed three-dimensional surface model for unfolding process; a part surface A memory 34 which stores data representing the shape of a part surface A of the sheet metal part; a part surface B memory 35 which stores data representing the shape of a part surface B of the sheet metal part;

a part surface interconnecting entity memory 36 which stores data representing entities interconnecting the two part surfaces A and B; a bend entity memory 37 which stores data representing entities showing bends; an unfolding three-dimensional surface model memory 38 which stores data representing the reconstructed three-dimensional surface mode; an unfolding controller 39 which determines an unfolded pattern; and an unfolding data memory 40 which stores unfolding data.

Figure 4A:
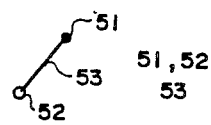
FIG. 4(a) is a diagram of assistance in explaining a three-dimensional scanner.

A procedure for producing an unfolded pattern of a sheet metal part will be described hereinafter with reference to FIG. 1 on an assumption that the three-dimensional scanner shown in FIG. 4(a) is employed.

The three-dimensional scanner is a pattern set for decomposing and unfolding a three-dimensional surface model, namely, a three-dimensional surface model having a shape stored in he pattern memory unit 25, of a sheet metal part. The three-dimensional scanner has scanning ends 51 and 52 and a scanning axis 53. The length of the scanning axis 53 corresponds to the thickness t of a metal plate forming the sheet metal part. The three-dimensional scanner is moved so as to meet a condition that both the scanning ends 51 and 52 shall be in contact with a surface showing the thickness of the three-dimensional surface model as shown by way of example in FIG. 4(b).

Figure 1:
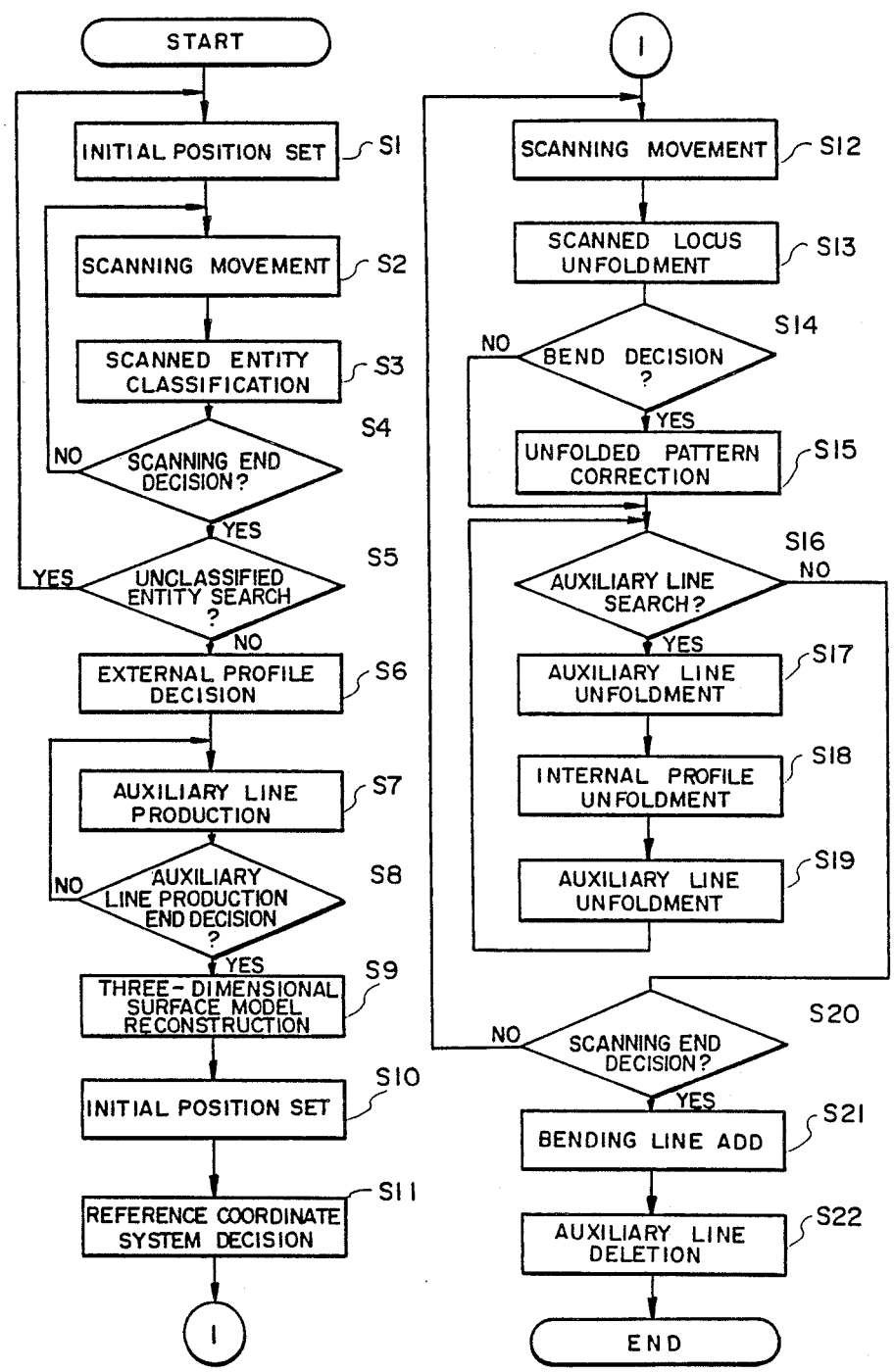
FIG. 1 is a flow chart showing the steps of a metal of unfolding a sheet metal part, in a preferred embodiment, according to the present invention.

First, the three-dimensional scanning controller 31 (FIG. 2) locates the three-dimensional scanner at the next end position on the three-dimensional surface model stored in the pattern memory unit 25 so as to meet the foregoing condition in an initial position setting step S1 (FIG. 1).

Figure 4B:
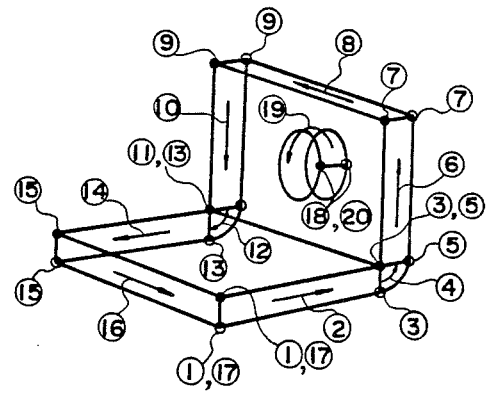
FIG. 4(b) is a diagrammatic illustration showing an exemplary movement of the three-dimensional scanner.

Then, the three-dimensional scanning controller 31 moves the three-dimensional scanner to the next end position on the three-dimensional surface model stored in the pattern memory unit 25 in a manner meeting the foregoing condition in a scanning moving step S2 as indicated at 2 and 3 in FIG. 4(b). The three-dimensional scanning controller 31 classifies pattern entity data obtained by the scanning movement of the three-dimensional scanner into those of pattern entities scanned by the three-dimensional scanner, pattern entities coinciding with the scanning axis and others, and then inputs the classified pattern entity data to the part surface A memory 34, the part surface B memory 35, the part surface interconnecting entity memory 36 and the bent entity memory 37 in scanned entity classifying step S3.

The scanning moving step S2 and the scanned entity classifying step S3 are repeated until the three-dimensional scanner returns to the initial position 1 (FIG. 4(b)). Then the three-dimensional scanning controller 31 makes a decision in a scanning end decision step S4 as to whether or not there is any entity not scanned, such as the inner profile as shown in FIG. 4(b). If so the initial position setting step S1, the scanning moving step S2, the scanned entity classifying step S3 and the scanning end decision step S4 are repeated in an unclassified entity searching step S5.

Figure 5:
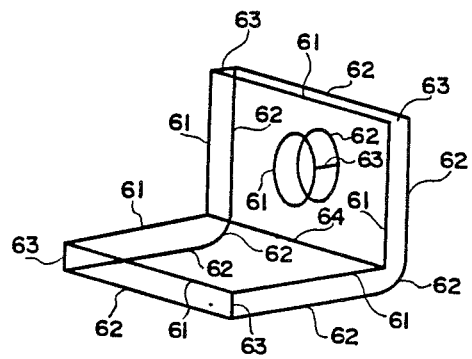
FIG. 5 is a diagrammatic illustration of assistance in explaining a made of classifying the pattern entities of a three-dimensional surface model.

In FIG. 5, there are shown the pattern elements 61, 62, 63 and 64 of the three-dimensional surface model to be stored in the part surface A memory 34, the part surface B memory 35, the part surface interconnecting entity memory 36 and the bent entity memory 37, respectively. The pattern entity data given to the part surface A memory 34 and the part surface B memory 35 in one scanning cycle from the initial position setting step S to the scanning end decision step S4 are stored in one pattern entity group.

Figure 6A:
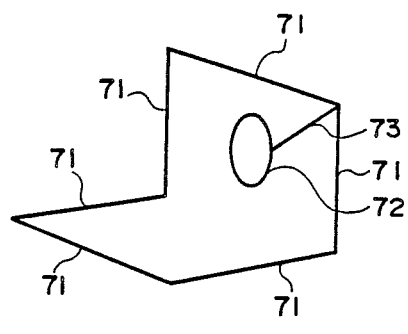
FIGS. 6(a) and 6(b) are diagrammatic illustrations showing, by way of example, auxiliary lines interconnecting an internal shape and an external shape.
Figure 6B:
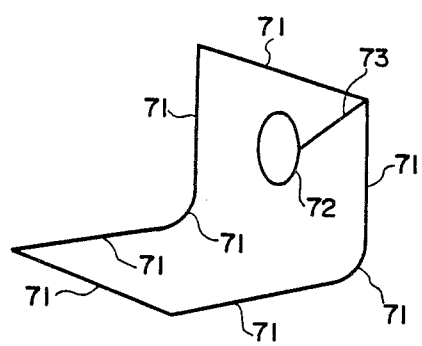
Figure 10A:
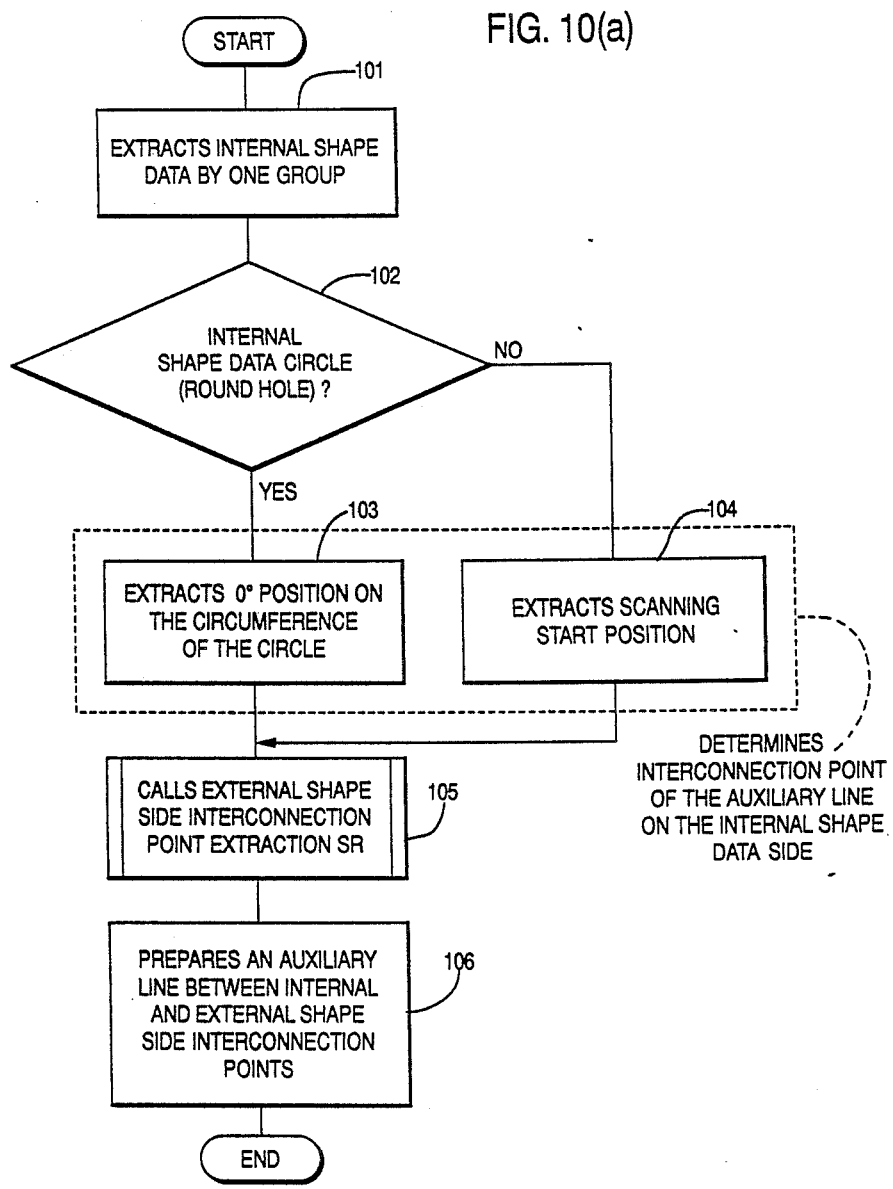
FIG. 10(a) is a flowchart illustrating the processing in the step S7.
Figure 10B:
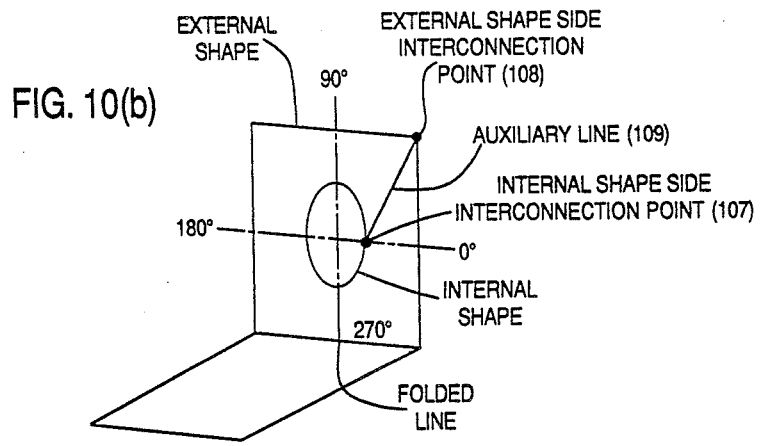
FIG. 10(b) is a view illustrating the same.

The closed pattern group interconnection controller 32 examines the pattern data stored in the part surface A memory 34 and the part surface B memory 35 and extracts the respective pattern entity groups 71 (FIGS. 6(a) and 6(b)) of the respective external shapes of the part surfaces in an external profile deciding step S6. The closed pattern group interconnection controller 32 regards the rest of the pattern entity groups such as pattern entities 72 in FIGS. 6(a) and 6(b) as those of the internal shape and extracts the remaining pattern entity groups one at a time to produce an auxiliary line 73 (FIGS. 6(a) and 6(b)) interconnecting an end point of each group and an end point of the pattern entity group of the external shape including the former end point in an auxiliary line producing step S7. FIG. 10(a) is a flowchart illustrating in more detail the processing in the step S7, and FIG. 10(b) is a view illustrating the flowchart of FIG. 10(a). Note that SR is a subroutine.

Figure 11B:
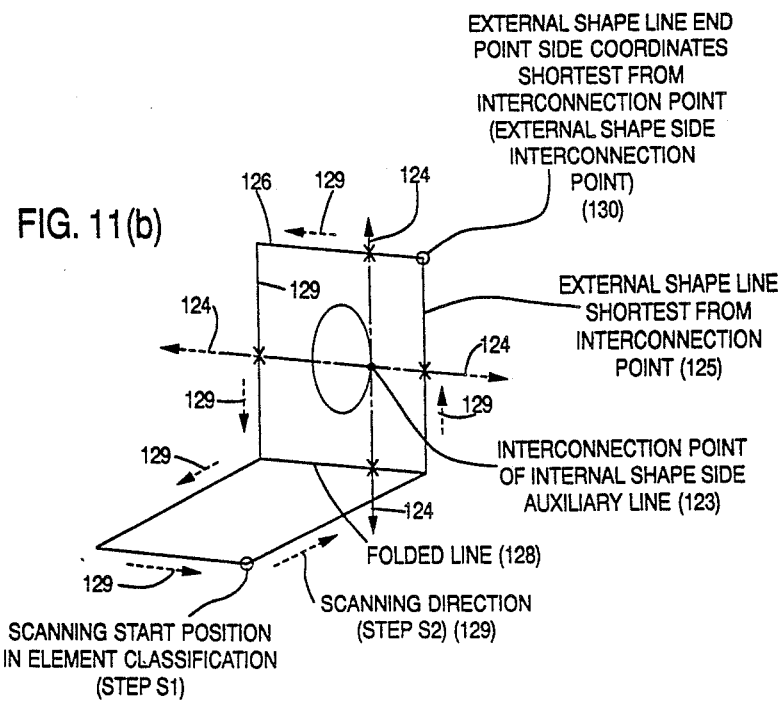
FIG. 11(b) is a view illustrating the same.
Figure 11A:
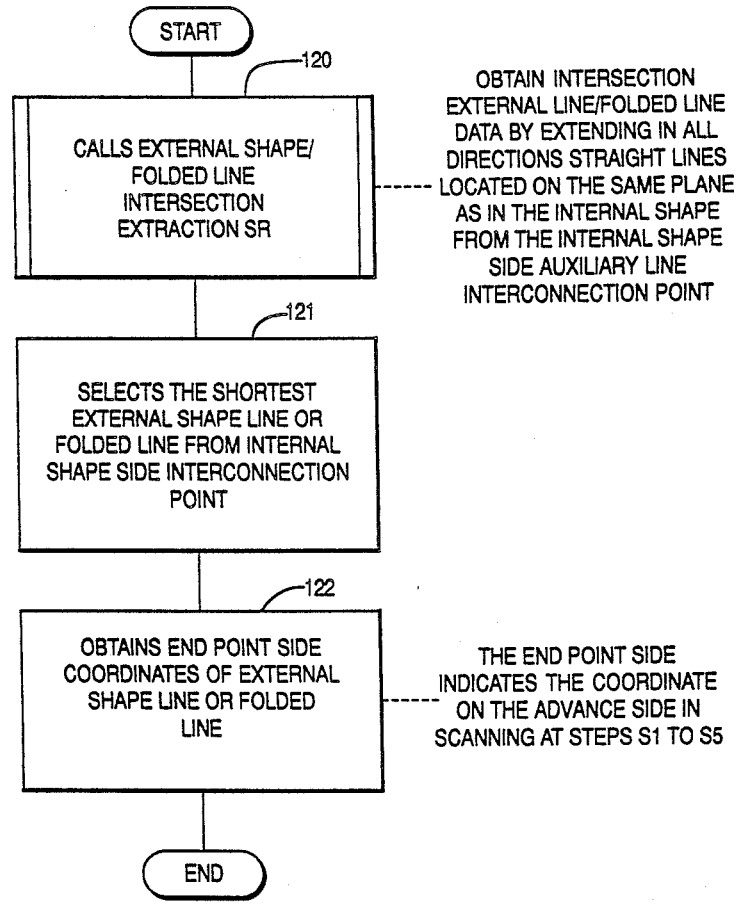
FIG. 11(a) is a flowchart of a subroutine in a block 105.

One group is extracted among internal shape pattern element groups in a block 101, and it is decided whether or not the internal shape is of a circle in a block 102. If so, the 0° position on the circumference is extracted as the interconnection point of the auxiliary line on the side of the internal shape in a block 103 (refer to FIG. 10(b) 107.), and otherwise a position taken by the three-dimensional scanner as the scanning start position in the same internal shape with the initial position set at S1 is extracted as the same point in a block 104. Then, a subroutine of extracting the interconnection point of the auxiliary line on the side of the external shape is called in a block 105. FIG. 11(a) is a flowchart illustrating the subroutine in the block 105, and FIG. 11(b) is a view illustrating the same. From the interconnection point of the auxiliary line on the internal shape side already estimated (FIG. 11(b) (123)), straight lines on the same surface as that of the internal shape are extended in all directions (FIG. 11(b) (124)) and external shapes (125 to 127) and folded lines (128) intersecting those straight lines are extracted in block 120. Those among the resulting external shapes or the folded lines, which are at shortest distances (125) from the interconnection point on the internal shape side, are selected in a block 121. An end point on the external shape or folded line so selected on the side of the direction of advancement of the three-dimensional scanner (the direction (129) of advancement of the three-dimensional scanner in steps from S1 to S5) is extracted as the interconnection point of the auxiliary line on the external shape side in a block 122 (refer to FIG. 11(b) (130)). Then, the resulting interconnection point (FIG. 10(b) (107)) on the internal shape side and that (FIG. 10(b) (108)) on the external shape side are connected by a straight line to each other as an auxiliary line (FIG. 10(b)(109)) in a block 106. The auxiliary line producing step S7 is repeated from all the pattern entity groups of the internal shape before an auxiliary line production end decision step S8.

Figure 7A:
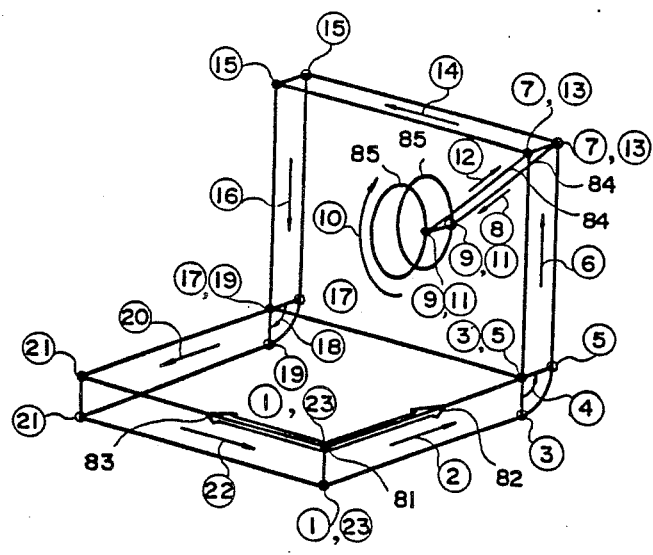
FIG. 7(a) is a diagrammatic illustration of assistance in explaining a manner of scanning operation, by way of example, of a three-dimensional scanner.
Figure 7B:
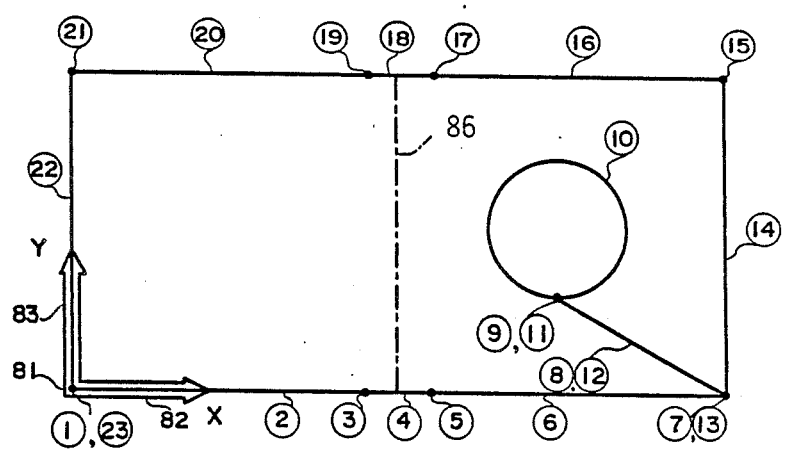
FIG. 7(b) is an unfolded pattern of a three-dimensional surface.
Figure 8:
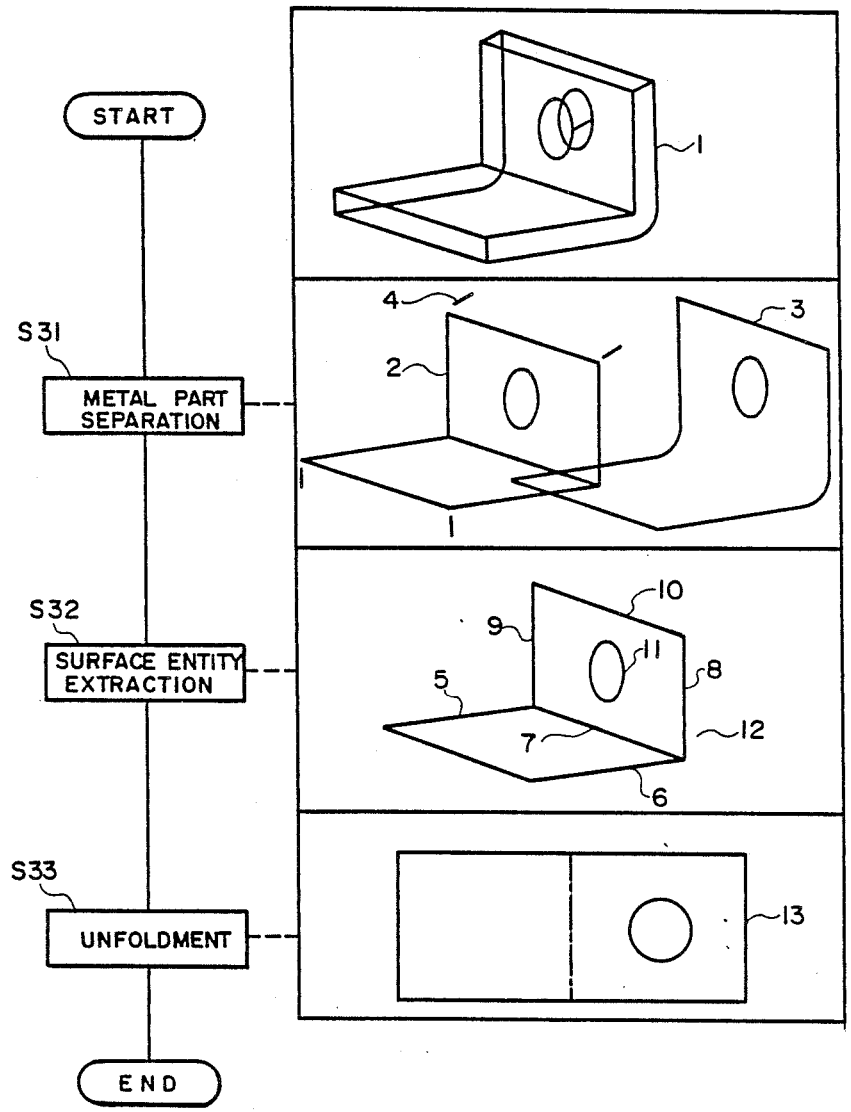
FIG. 8 is a diagrammatic illustration showing the steps of a conventional method of unfolding the sheet metal part employing a CAD apparatus.

Then, the part surface interconnection controller 33 transfers the pattern data stored in the part surface A memory 34, the part surface B memory 35, the part surface interconnecting entity memory 36 and the bend entity memory 37 into the unfolding three-dimensional surface model memory 38 in a three-dimensional surface model reconstructing step S9 to reconstruct an unfolding three-dimensional surface model. FIG. 7(a) illustrates, by way of example, a scanning operation of the three-dimensional scanner, and FIG. 7(b) illustrates an unfolded shape of the three-dimensional surface model.

Then, the three-dimensional scanning controller 31 examines the pattern data of the three-dimensional surface model stored in the unfolding three-dimensional surface model memory 38 and locates the three-dimensional scanner at an end point 1 (FIG. 7(a)) on the external shape in an initial position setting step S10 so as to meet the aforesaid condition.

Figure 12A:
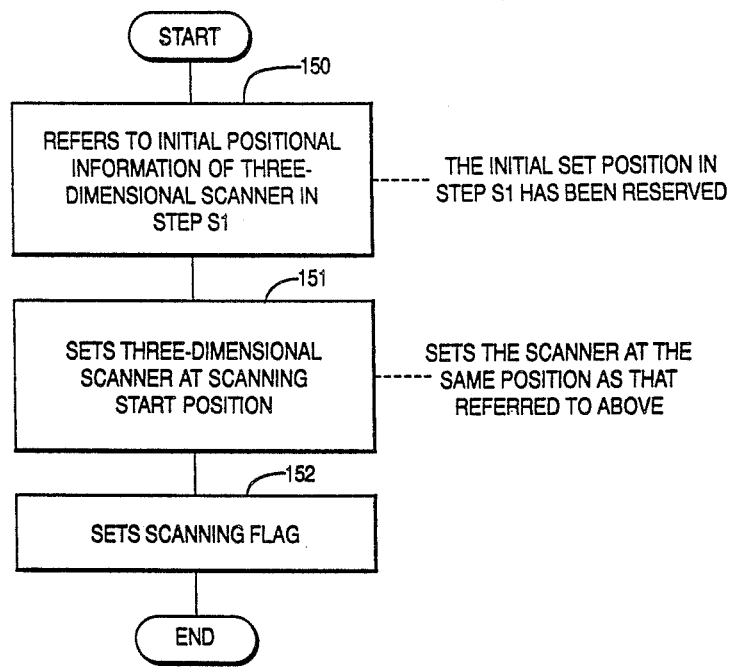
FIG. 12(a) is a flowchart illustrating the processing in a step S10.
Figure 12B:
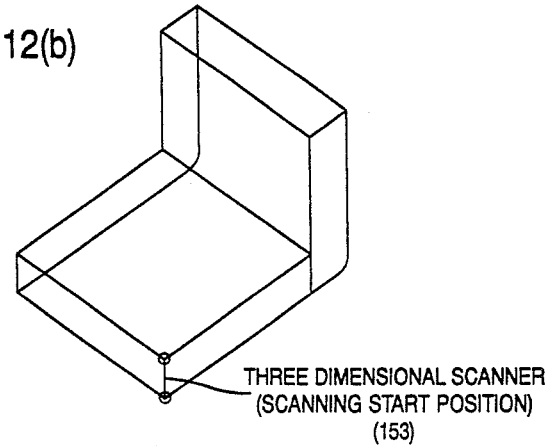
FIG. 12(b) is a view illustrating the same.

FIG. 12(a) is a flowchart illustrating a processing in a step S10, and FIG. 12(b) is a view illustrating the same. The initial position of the three-dimensional scanner on the three-dimensional shape is taken to be the same as the position set first in the step S1, and hence the three-dimensional scanner is set in a block 151 (refer to FIG. 12(b) (153)) with reference to the aforesaid positional information in a block 150. Additionally, a scanning flag is set which indicates that the position of the three-dimensional scanner is a first position in a block 152.

Then, the unfolding controller 39 examines the pattern data stored in the unfolding three-dimensional surface model memory 38, and then sets a rectilinear plane coordinate system for expressing an unfolded shape, having its origin 81 at one of the scanning ends of the three-dimensional scanner, an X-axis 82 extending from the origin in a plane including the scanning end employed as the origin in one of the possible directions of the next movement of the three-dimensional scanner, and an Y-axis 83 extending from the origin in the same plane (FIG. 7(a)) in a reference coordinate system deciding step S11. Positive values for X-coordinate are measured in the direction of the next movement of the three-dimensional scanner on the X-axis.

Figure 13A:
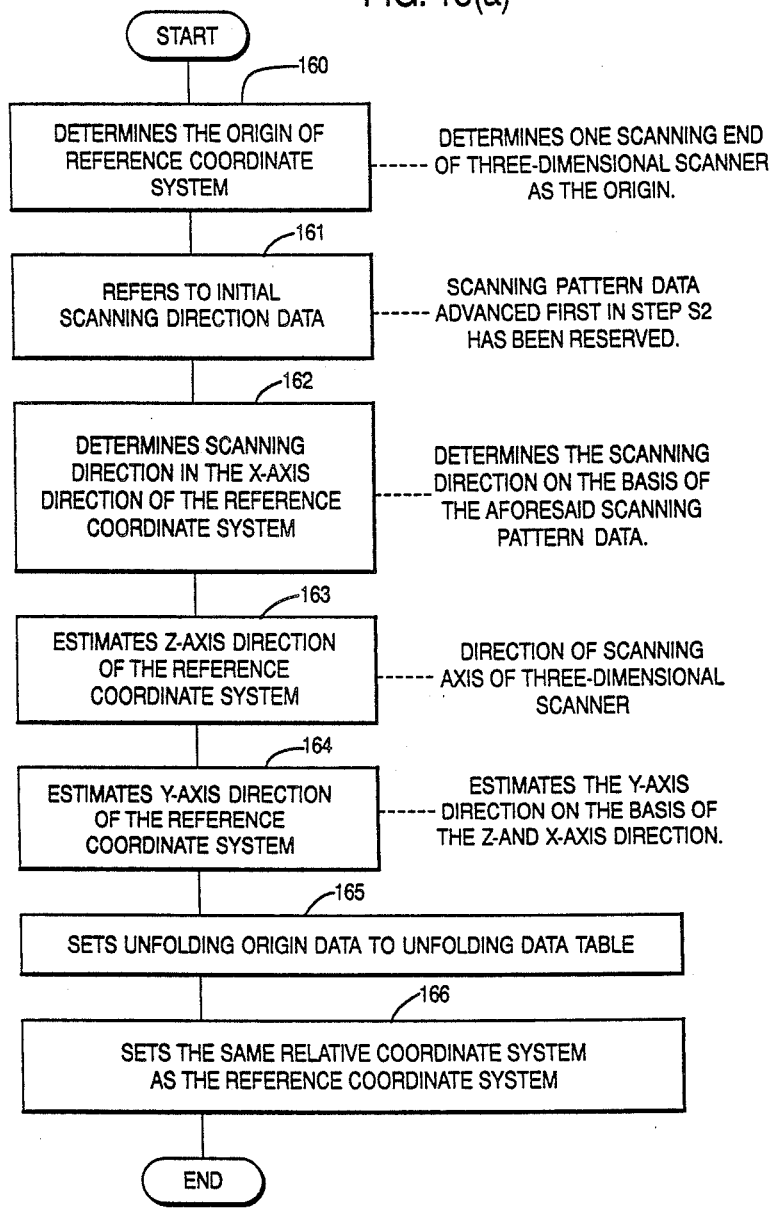
FIG. 13(a) is a flowchart illustrating the processing in a step S11.
Figure 13B:
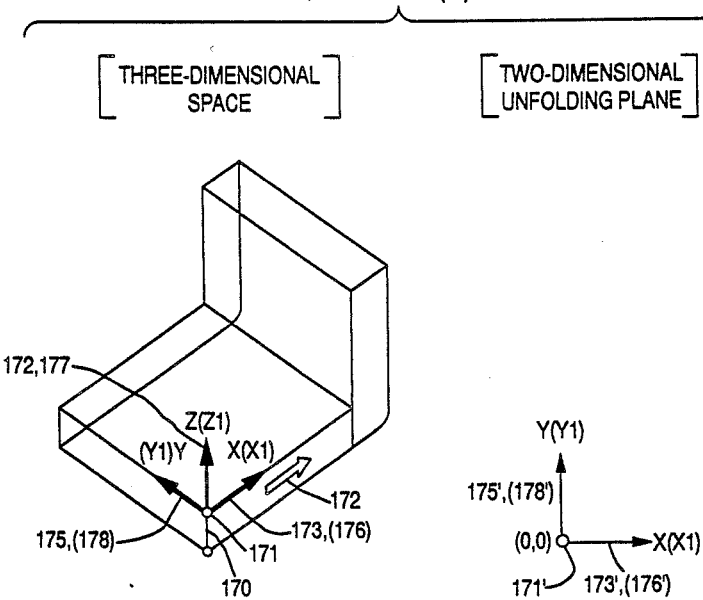
FIG. 13(b) is a view illustrating the same.

FIG. 13(a) is a flowchart of a processing in a step S11, and FIG. 13(b) is a view illustrating the same. One scanning end of three-dimensional scanner is taken as the origin of a reference coordinate system upon unfolding in a block 160 (FIG. 13(b) (171)) and the X-axis direction of the reference coordinate system is taken as a direction where the three-dimensional scanner advances first from the first position on the three-dimensional shape, and hence that scanning direction is taken as the X-axis direction of the reference coordinate system in a block 162 (FIG. 13(b) (173)) with reference to the information of that scanning direction in a block 161 (FIG. 13(b) (172)).

Then, a direction toward the origin from the scanning end of the three-dimensional scanner, which end is not selected as the origin in the block 160, is determined as being the Z-axis direction of the reference coordinate system in a block 163 (FIG. 13(b) (174)) and the Y-axis direction is determined on he basis of an outer product of the vector in the Z-axis direction and the vector in the X-axis direction in a block 164 (FIG. 13(b) (175)). The X-Y plane of the three-dimensional reference system (FIG. 13(b) (173, 175)) is a plane being a reference upon preparation of a two-dimensional unfolding shape (FIG. 13(b) (173', 175')). Additionally, data concerning the origin (0,0) (FIG. 13(b) (171')) on the two-dimensional unfolding lane corresponding to the origin of the three-dimensional reference coordinate system (FIG. 13(b) (171)) is set in a table in a block 165, and a relative coordinate system X1, Z1, Y1 (FIG. 13(b) (176 to 178)) of the same coordinate system as the reference coordinate system X, Z, Y (FIG. 13(b) (173 to 175)) is set in a block 166. Thereupon, a plane (FIG. 13(b) (176', 178')) on the two-dimensional unfolding plane corresponding to the X1-Y1 plane (FIG. 13(b) 176, 178) of the relative coordinate system is also set.

Then, in a scanner moving step S12, the three-dimensional scanning controller 31 moves the three-dimensional scanner set for the pattern data stored in the unfolding three-dimensional surface model memory 38 to the next end point in a manner meeting the aforesaid condition (2 and 3 in FIG. 7(a)), and then gives locus data representing the locus of three-dimensional movement of the scanning end of the three-dimensional scanner, employed for setting the origin of the coordinate system for expressing an unfolded shape to the unfolding controller 39.

Figure 14B:
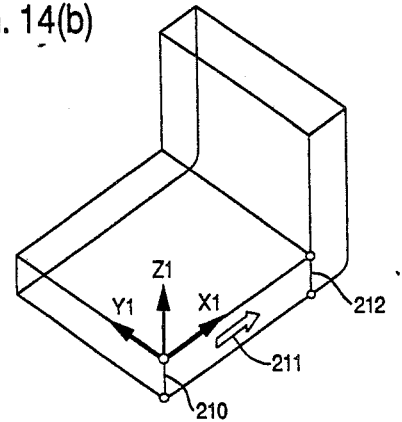
FIG. 14(b) is a view illustrating the same.
Figure 14A:
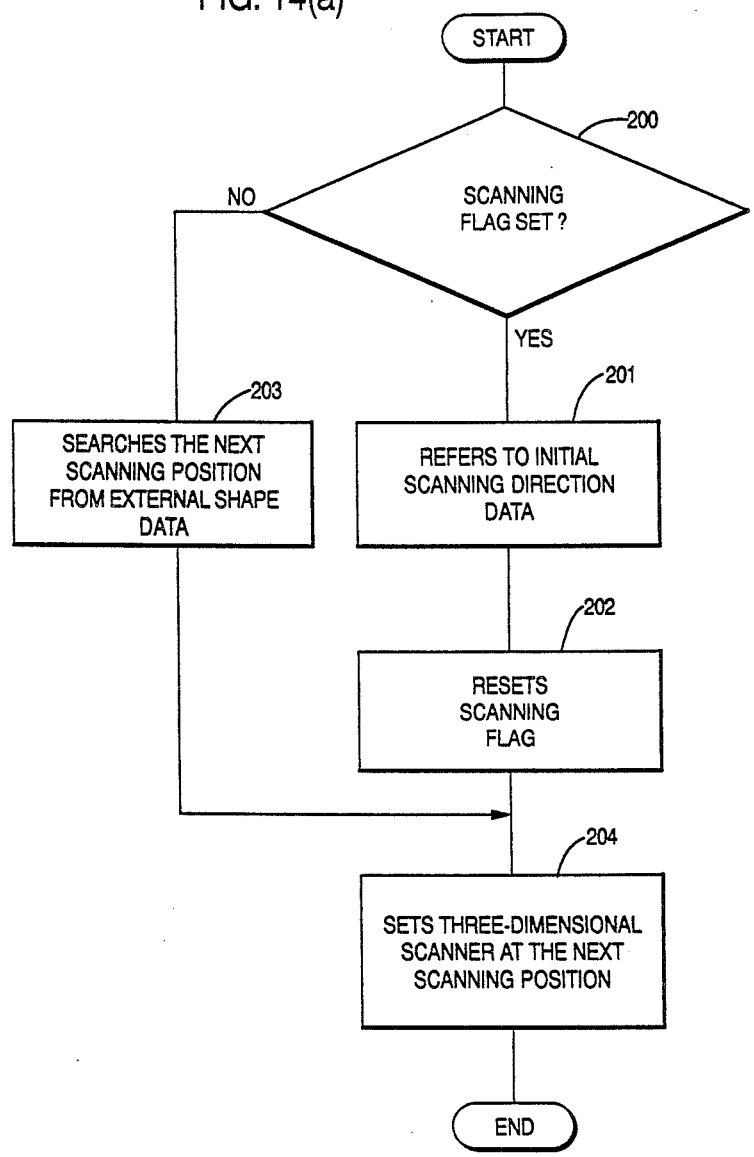
FIG. 14(a) if a flowchart illustrating the processing in a step S12.

FIG. 14(a) is a flowchart of the processing in the step S12, and FIG. 14(b) is a view illustrating the same. The scanning flag decides in a block 200 whether or not the scanning of the three-dimensional scanner is a first one from the initial position (FIG. 14(b) (210)), and if so, the scanning flag is reset in a block 202 with reference to the information of the scanning direction in a block 201 (FIG. 14(b) (211)). If not so, the next scanning position is searched in the external shape pattern data in a block 203. The three-dimensional scanner is set at the next scanning position (FIG. 14(b) (212)) found in the above process in a block 204.

Then, in a scanned locus unfolding step S13, the unfolding controller 39 converts the locus data into pattern data (2 in FIG. 7(b)) for expressing an unfolded pattern on the plane coordinate system and, in a bend deciding step S14, decides whether or not the locus corresponds to a bend of the surface of the sheet metal part on the basis of the variations of the direction of the scanning axis of the moving three-dimensional scanner (3, 4 and 5 in FIG. 7(a)), corrects the length of the unfolded pattern (3, 4 and 5 in FIG. 7(b)) in an unfolded pattern correcting step S15, and then stores the unfolded pattern data in the unfolding data memory 40.

The external shape unfolding processing from the scanning locus unfolding of the three-dimensional scanner is the step S13 to the bend decision in the step S14 and the unfolded pattern correction in the step S15 will be described in detail with reference to FIGS. 15 through 18. (Although also the unfolding processings of the auxiliary line and the internal shape are performed in fact in the external shape unfolding processing, only the external shape unfolding processing will here be described.)

Figure 15A:
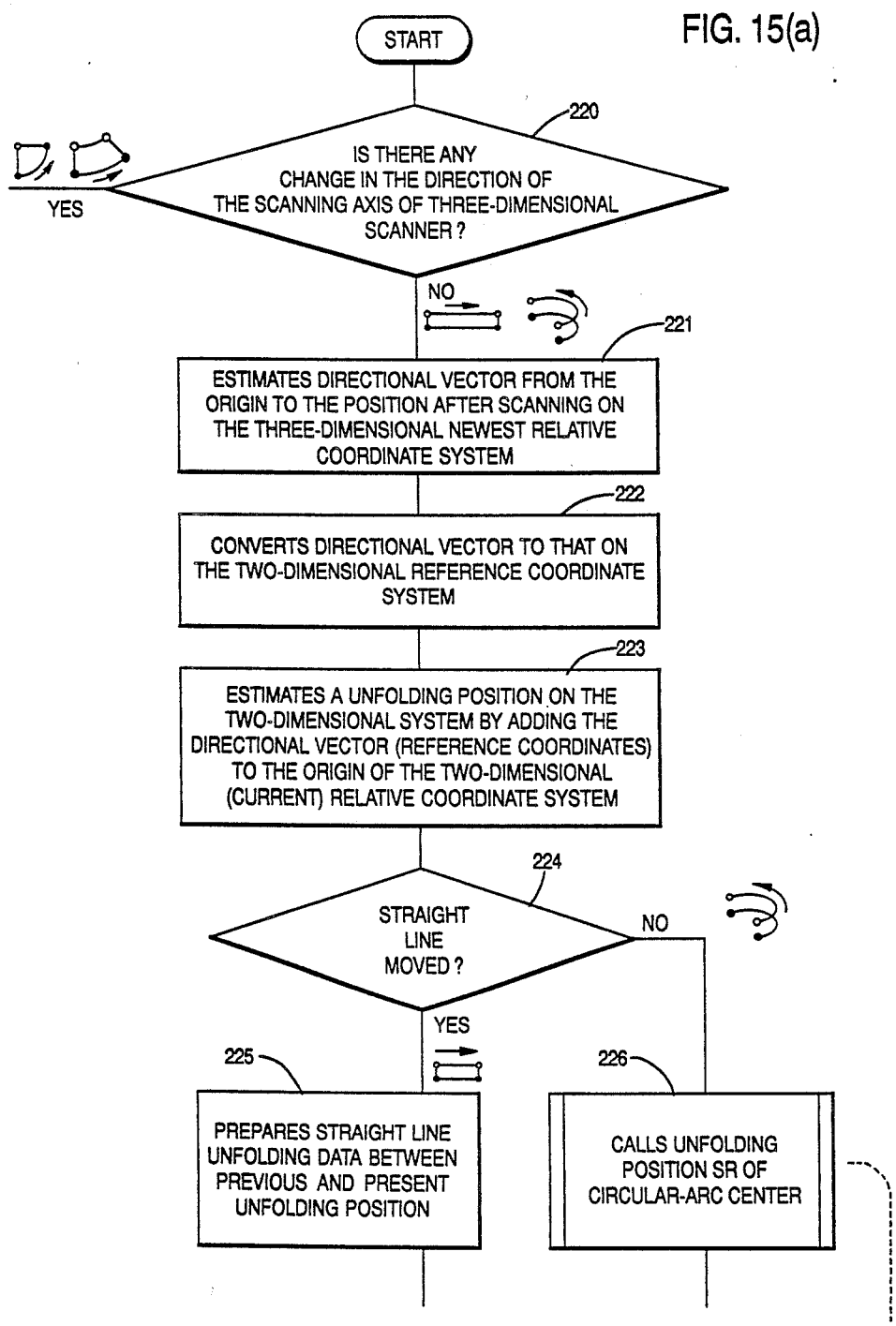
FIG. 15, consisting of FIGS. 15(a);and 15(b), is a flowchart illustrating the processing in a step S13.
Figure 15B:
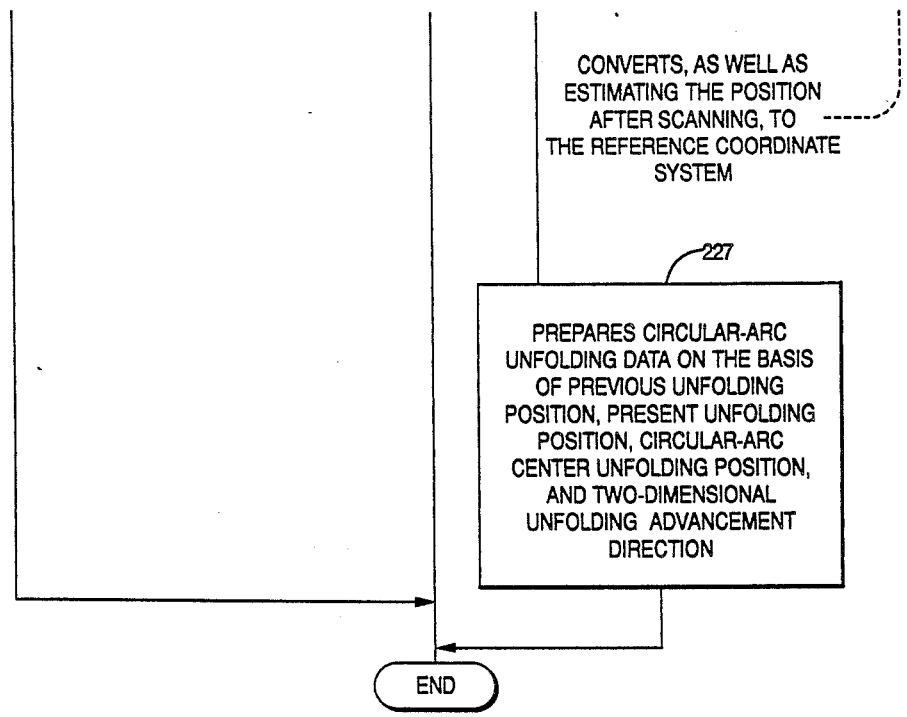
Figure 15:
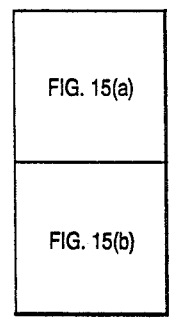

FIG. 15 is a flowchart of the processing in the step S13, and FIG. 18 is a view illustrating the external shape unfolding.

It is first determined whether or not the scanning of the three-dimensional scanner is for the bent section of a three-dimensional pats shape, on the basis of a change in the direction of the scanning axis of the three-dimensional scanner before and after the scanning in a block 220. If the direction is changed (232 to 251 in FIG. 18(b), for example), then the scanning is found to be the bent section. Accordingly, in steps S14 and S15 the length of correction is calculated for the unfolding. If it is not changed (231 to 232 in FIG. 18(a), for example), then a direction a vector (FIG. 18(a) (237)) from the origin (FIG. 18(a) (235)), on the relative coordinate system (233 in FIG. 18(a), for example) to the position of the scanner after the scanning (FIG. 18(a) (236)) is estimated in a block 221, which vector is then set (FIG. 18(a) (237')) on the two-dimensional unfolding plane (FIG. 18(a) (233')). In addition, the directional vector on the two-dimensional unfolding plane is converted to that on the two-dimensional reference coordinate system (FIG. 18(a) (234') (the same as the relative coordinate system (FIG. 18(a) (233') in the present example)) in a block 222, which is then added to one (FIG. 18(a) (238')) where the origin of the relative coordinate system (FIG. 18(a) (235')) is expressed by the reference coordinates, in a block 223 to estimate a position (FIG. 18(a) (239')) on the two-dimensional unfolding plane. If the scanning of the three-dimensional scanner is a liner movement, in a block 224, then a straight line unfolding data is prepared between an unfolding position defined immediately before (FIG. 18(a) (238')) and the present unfolding position (FIG. 18(a) (239')), in a block 225. On the other hand, if it is a circular-arc movement, then the center position of the circular-arc is also estimated by converting it from the relative coordinate system to the reference system as in the scanning position unfolding processing in a block 226, and circular-arc unfolding data is prepared in a block 227 on the basis of the unfolding position yielded immediately before, the present unfolding position, the circular-arc center unfolding position, and the advancing direction of the two-dimensional unfolding.

Figures 16, 16A:
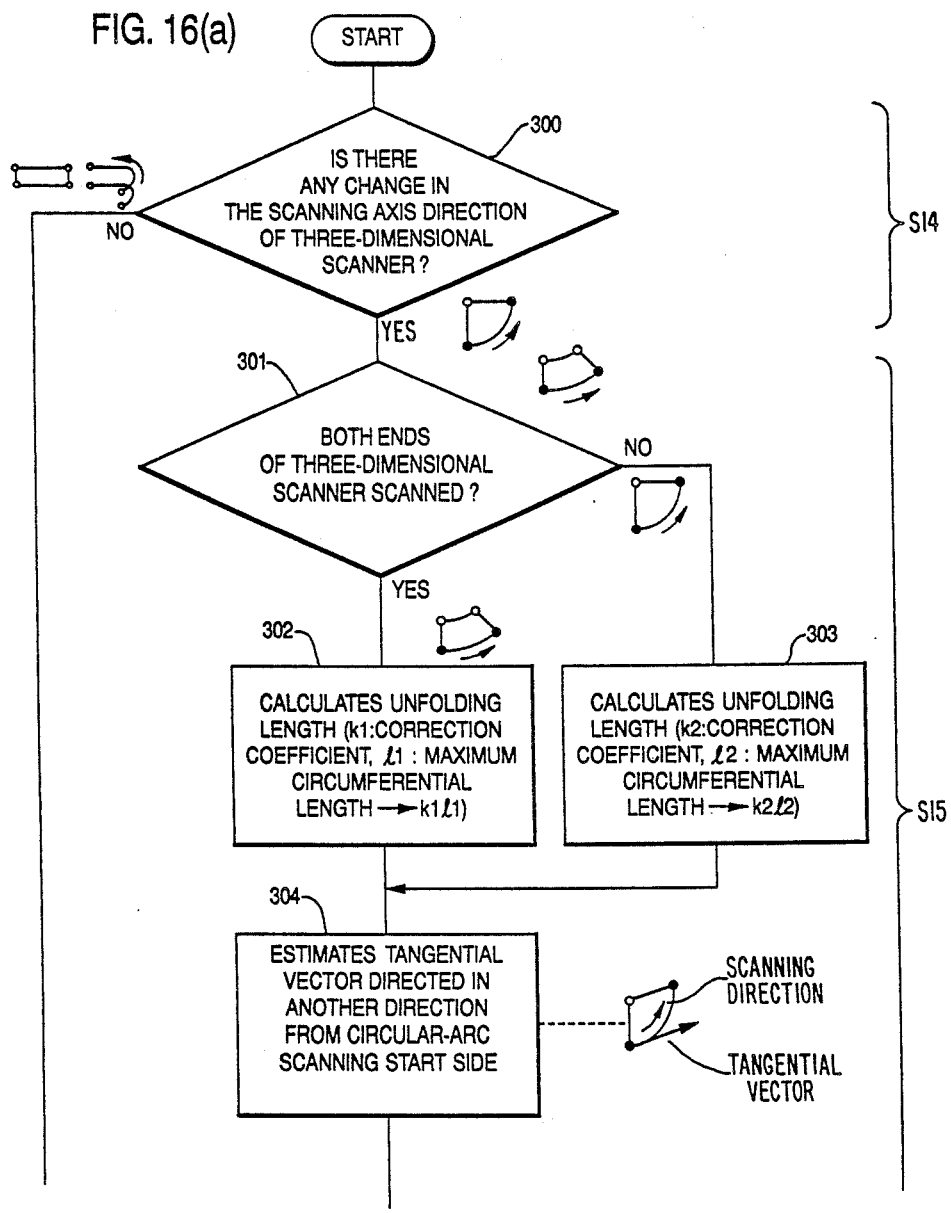
FIG. 16, consisting of FIGS. 16(a)-16(c), is a flowchart illustrating the processings in steps S14 and S15.
Figure 16B:
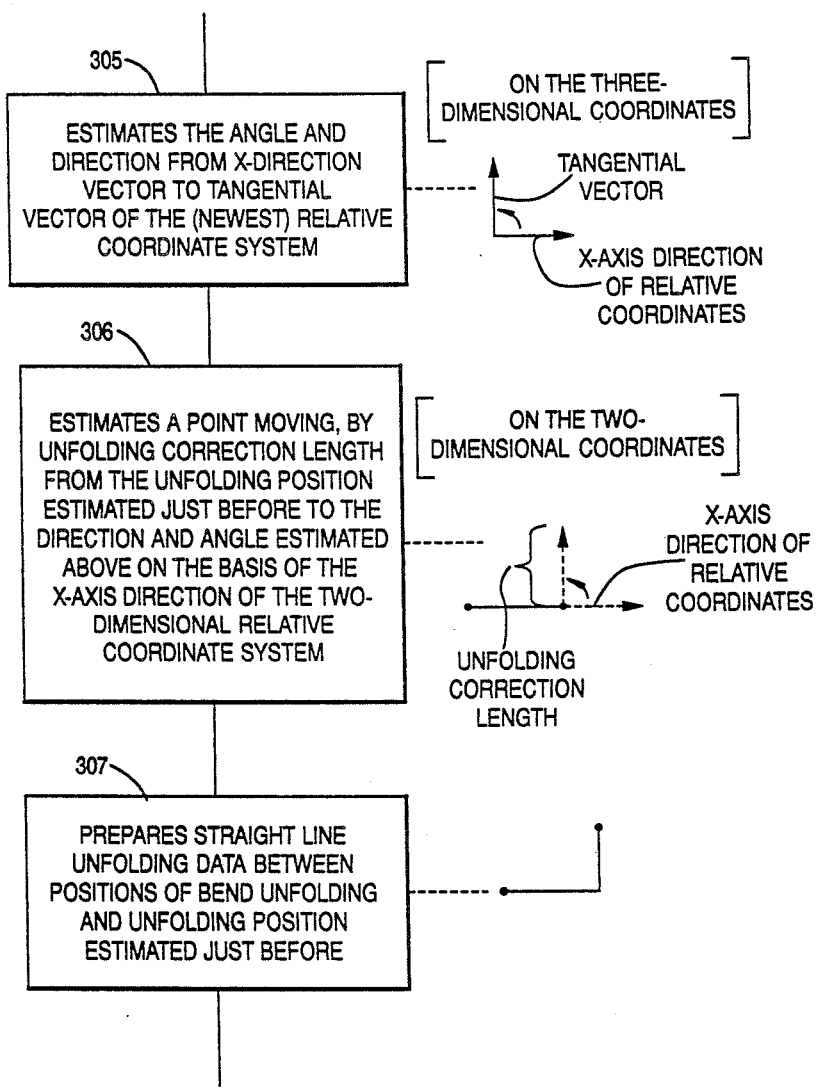
Figure 16C:
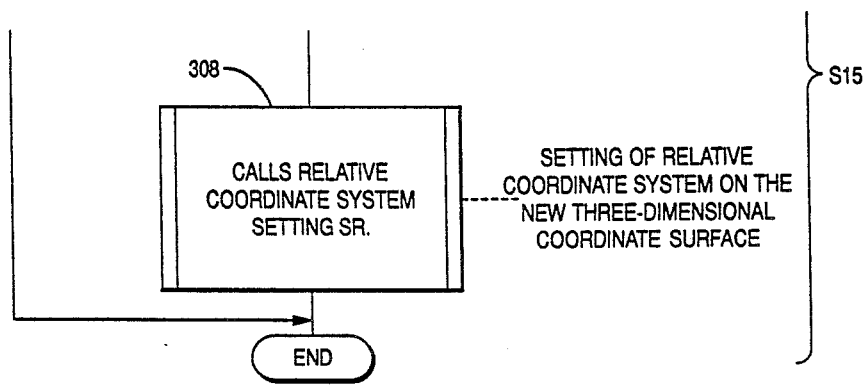

FIG. 16 is a flowchart illustrating the steps S14 and S15. It is determined whether or not he change in the direction of the scanning axis of the three-dimensional scanner after the scanning corresponds to the bend section in a block 300, and if the direction is not changed, then the operation jumps to a processing in a stp S16. If so (FIG. 18(b) (232 to 251)), then the kind of the bend is decided on the basis of the movements of both ends of the scanning axis of the three-dimensional scanner in a block 301, and the length of the scanning upon unfolding for every kind of the bend is estimated in block 302 and 303.

Figures 18A, 18B:
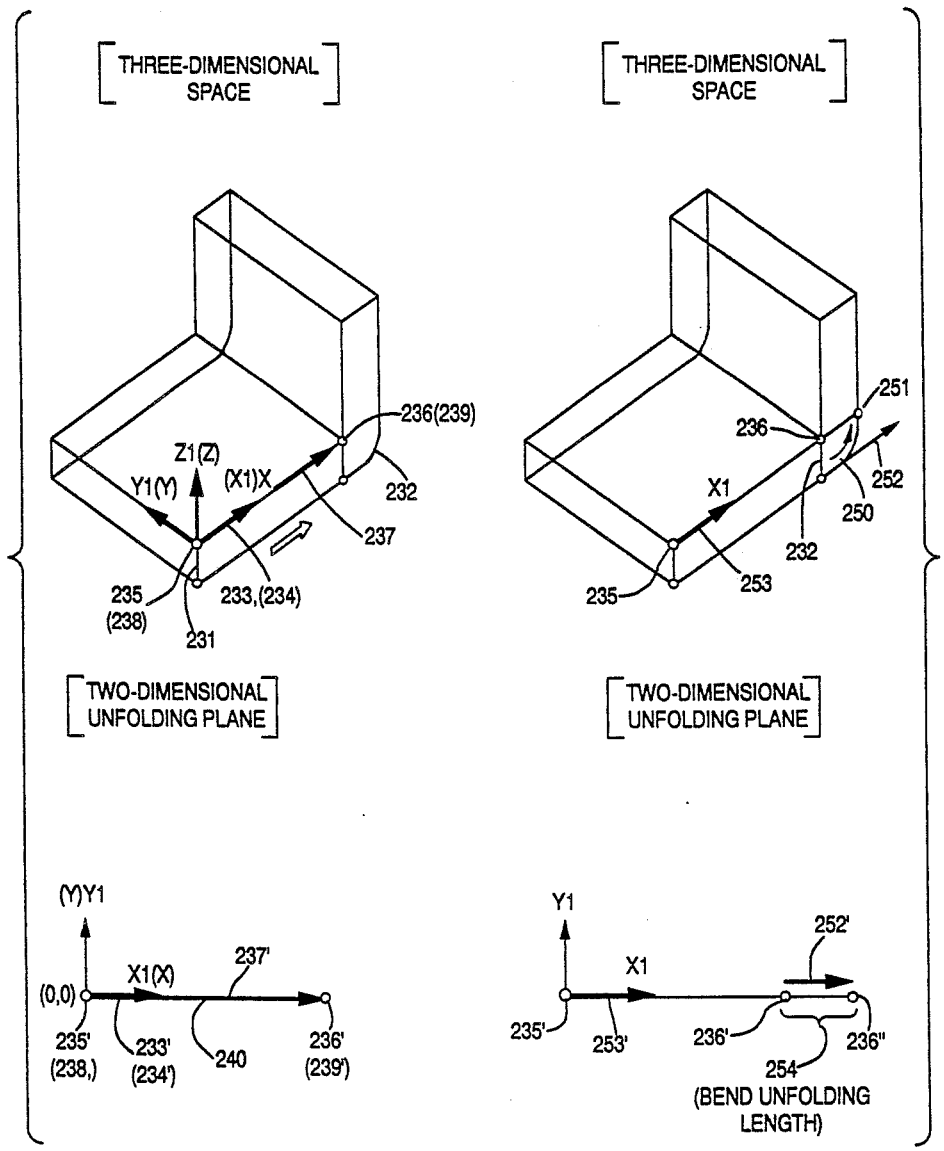
Figure 18E:
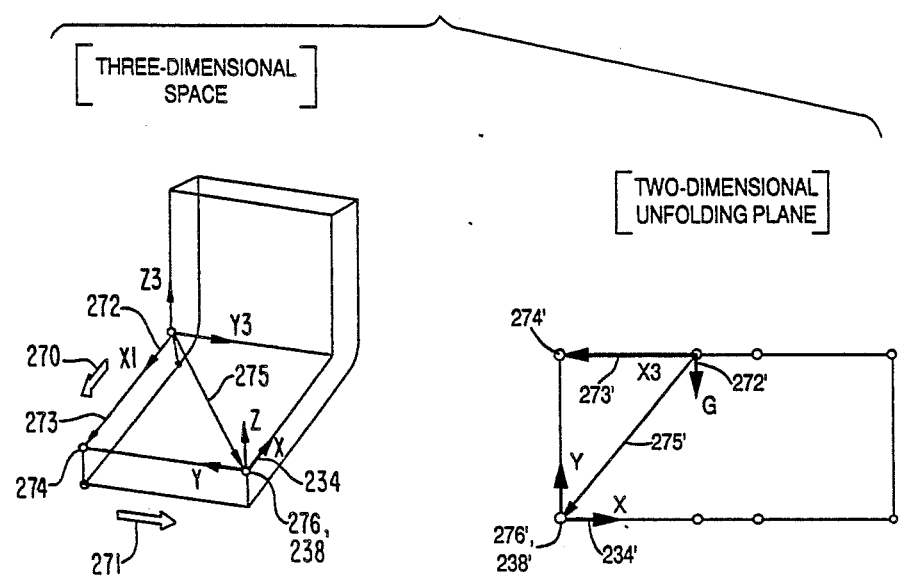

In succession, a tangential vector directed in the advancing direction of the circular-arc scanning at the bend section (FIG. 18(b) (252)) is estimated in a block 304. The angle and direction between the X-axis direction of the relative coordinate system (X1-axis direction of FIG. 18(b) (253)) and the tangential vector of the same are estimated in a block 305, and a point shifted on the two-dimensional unfolding plane from the X-axis direction of the relative coordinate system (Xl-axis direction of FIG. 18(b) (253')) to the angular direction estimated just above by the distance of the unfolding calculation (FIG. 18(b) (254)) is estimated in a block 306, and further the unfolding position yielded just before (FIG. 18(b) (236')) and the point shifted by the unfolding calculation length (FIG. 18(b) (236")) are connected with a straight line in a block 307. Since the three-dimensional scanner is transferred to another plane on the three-dimensional parts shape after passing through the bend section, a three-dimensional relative coordinate system on a new surface of the scanner is reset in a block 308 (FIG. 18(c) (254)).

Figure 17:
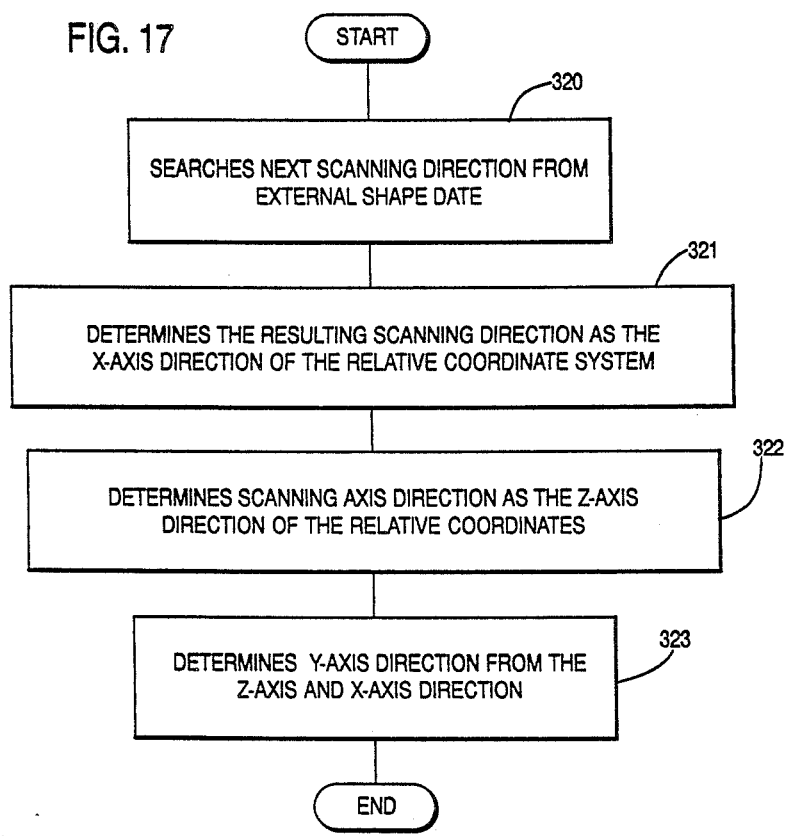
FIG. 17 is a flowchart illustrating the processing of setting a relative coordinate system.

FIG. 17 is a flowchart illustrating the relative coordinate system so set.

First, the next scanning direction of the three-dimensional scanner (FIG. 18(c) (261)) is searched from the external shape in a block 320 and the resulting scanning direction is taken as the X-axis direction of a new relative coordinate system (X2 of FIG. 18(c) (254)) in a block 321 and the direction of the scanning axis of the three-dimensional scanner is taken as the Z-axis direction (Z2 of FIG. 18(c) (254)) in a block 322. The Y-axis direction (Y2 of FIG. 18(c) (254)) is defined from the Z and X axes taken as above in a block 323. In the same manner as described previously, since the three-dimensional scanner scans the same plane until it passes through the bend section of the three-dimensional parts shape, directional vectors to respective scanning positions o the same relative coordinate system are estimated and converted to reference coordinates on a two-dimensional unfolding plane to estimate unfolding positions. Those positions are connected by straight lines or circular-arcs to each other. If there is any bend section, then the relative coordinate system is altered to one suited to the new plane, which is repeated until the three-dimensional scanner returns to the initial set position (FIG. 18(a) through 18(e)).

Then, in an auxiliary line search step S16, the unfolding controller 39 decides whether or not auxiliary line 84 (FIG. 7(a)) extends from the scanning end of the three-dimensional scanner set for the pattern data stored in the unfolding three-dimensional surface model memory 38, executes the scanner moving step S12 (7, 8 and 9 in FIG. 7(a)) and the scanned locus unfolding stp S13 (7, 8 and 9 in FIG. 7(b)) to unfold the auxiliary line in an auxiliary line unfolding step S17. Furthermore, in an internal profile unfolding step S18, the unfolding controller 39 repeats the scanner moving step S12 (9, 10 and 11 in FIG. 7(a)), the scanned locus unfolding step S13 (9, 10 ad 11 in FIG. 7(b)), the bend deciding step S14 and the unfolded pattern correcting step S15 to unfold an internal pattern 85 (FIG. 7(a)) until the three-dimensional scanner returns to the end point of the auxiliary line, and then, in an auxiliary line unfolding step S19, executes the scanner moving step S12 (11, 12 and 13 in FIG. 7(b)) and the scanned locus unfolding step S13 (11, 12 and 13 in FIG. 7(a)) to return the three-dimensional scanner again to the end point of the auxiliary line on the external shape in order to unfold the auxiliary line. The unfolding controller 39 executes the auxiliary line search step S16, the auxiliary line unfolding step S17, the internal profile unfolding step S18 and the auxiliary line unfolding step S19 repeatedly for all the auxiliary lines extending from the end point of the three-dimensional scanner.

Then, in a scanning end deciding step S20, the three-dimensional scanning controller 31 repeats the scanner moving step S12, the scanned locus unfolding step s13, the bend deciding step S14, the unfolded pattern correcting step S15, the auxiliary line search step S16, the auxiliary line unfolding step S17, the internal profile unfolding step S18 and the auxiliary line unfolding step S19 (1 to 23 in FIG. 7(a) and 1 to 23 in FIG. 7(b)) until the three dimensional scanner returns to the initial position (1 in FIG. 7(a)).

Then, in a bending line adding step S21, the unfolding controller 39 examines the unfolded pattern stored in the unfolding data memory 40, and then adds a bending line 86 (FIG. 7(b)) between unfolded patterns each provided with a bend allowance (4 and 18 in FIG. 7(b)).

Finally, in an auxiliary line deleting step S22, the unfolding controller 39 examines the unfolded pattern stored in the unfolding data memory 40, and then deletes all the unfolded auxiliary lines (8 and 12 in FIG. 7(b)) to end the three-dimensional surface model unfolding operation.

Thus, the unfolded shape of a three-dimensional sheet metal part can automatically be obtained through a series of the foregoing steps of the sheet metal part unfolding method of the present invention.

Although the invention has been described in its preferred form with a certain degree of particularity, obviously many modifications and variations of the present invention are possible in the light of the above teachings. It is therefore to be understood that the present invention may be practiced otherwise than as specifically described herein without departing from the scope and spirit thereof.

What is claimed is:

1. A method of unfolding sheet metal part employing a CAD apparatus, which comprises:
a first step in which a three-dimensional surface model of a sheet metal part provided by a data input device is decomposed into pattern entities through the scanning movement of a three-dimensional scanner having a scanning axis whose length is equal t the thickness of the sheet metal forming the sheet metal part, and the pattern entities thus obtained are classified into groups;
a second step in which auxiliary lines are generated, each auxiliary line connecting an end point of one of the pattern entities of an internal shape of the sheet metal part and an end point of a pattern entity of an external shape forming a plane including the end point of the pattern entity of the internal shape;
a third step in which the three-dimensional surface model decomposed in the first step is reconstructed into a reconstructed three-dimensional surface model by assembling the pattern entities and the auxiliary lines, and the reconstructed three-dimensional surface model is unfolded into a two-dimensional pattern on the basis of a scanning operation of the three-dimensional scanner in which the external shape of the reconstructed three-dimensional surface model is scanned by the three-dimensional scanner having the scanning axis corresponding to the thickness of the sheet metal and the loci of the thus obtained three-dimensional scanner is unfolded into the two-dimensional reference plane;
a fourth step in which a decision is made on the basis of the direction of the scanning as of the scanning three-dimensional scanner as to whether or not the sheet metal part has any bend, the length of a pattern entity corresponding to an unfolded bend unfolded in the third step when the sheet metal part has a bend or bends, and a bending line or lines are added to the unfolded two-dimensional pattern;
a fifth step in which a decision is made as to whether or not the reconstructed three-dimensional surface model has any auxiliary lines and, when the reconstructed three-dimensional surface model has an auxiliary line or lines, the auxiliary line or lines and a pattern entity or entities of the internal shape connecting with the auxiliary line or lines are unfolded; and
a sixth step in which an unfolded pattern or patterns corresponding to the auxiliary line or lines ar deleted from the unfolded pattern of the three-dimensional surface model after the completion of the scanning operation of the three-dimensional scanner.

2. An apparatus for unfolding a sheet metal part employing a CAD apparatus including a pattern display unit, a pattern operating data input unit, a position data input unit, a pattern processing unit, and a pattern memory, wherein said CAD apparatus further includes an automatic sheet metal part unfolding unit comprising:
a three-dimensional scanning means for scanning a three-dimensional surface model of a sheet metal part along surfaces of the model representing the thickness of the sheet metal forming the sheet metal part and for decomposing the three-dimensional surface model into two part surface entities, entities interconnecting the two part surface entities and entities of a bend or bends;
a closed pattern group interconnection means for producing an auxiliary line for interconnecting a group of entities forming the external profile of the sheet metal part, and a group of entities forming the internal profile of the sheet metal part such as punched hole or holes;
a part surface interconnection means for assembling the entities obtained by decomposing the three-dimensional surface model to reconstruct a reconstructed three-dimensional surface model;
a part surface memory means for storing data representing the shape of one of two major part surfaces of the sheet metal part;
a part surface memory means for storing data representing the shape of the other of the two major part surfaces of the sheet metal part;
a part surface interconnecting entity memory means for storing data representing entities interconnecting the two major part surfaces;
a bend entity memory means for storing data representing entities of a bend or bends;
an unfolding controller means for determining an unfolded pattern; and
an unfolding data memory means for storing unfolding data for producing an unfolded pattern of the sheet metal part.

* * * * *